(12) United States Patent
Girod

(10) Patent No.: US 6,687,506 B1
(45) Date of Patent: Feb. 3, 2004

(54) RADIOTELEPHONE FILTERING APPARATUS

(76) Inventor: Raoul Girod, Montagny, 69210 Bully (FR)

(*) Notice: Subject to any disclaimer, the term of this patent is extended or adjusted under 35 U.S.C. 154(b) by 0 days.

(21) Appl. No.: 09/445,260

(22) PCT Filed: Jun. 2, 1998

(86) PCT No.: PCT/FR98/01109
§ 371 (c)(1),
(2), (4) Date: Jan. 4, 2000

(87) PCT Pub. No.: WO98/56130
PCT Pub. Date: Dec. 10, 1998

(30) Foreign Application Priority Data

Jun. 2, 1997 (FR) .............................. 97 07000
Aug. 1, 1997 (FR) .............................. 97 10105

(51) Int. Cl.⁷ .......................... H04Q 7/20; H04K 3/00
(52) U.S. Cl. .................. 455/456.4; 455/1; 455/63.4
(58) Field of Search .................. 455/63.1, 431, 455/456, 409, 403, 528, 457, 422, 69, 440, 445, 517, 527, 1, 9, 421, 63.4, 63.3, 66.1, 456.4; 342/357.1, 450, 357.09, 357.14, 357.13, 457, 463

(56) References Cited

U.S. PATENT DOCUMENTS

| | | | | |
|---|---|---|---|---|
| 4,103,236 A | * | 7/1978 | Deserno et al. ............. | 455/1 |
| 5,001,771 A | * | 3/1991 | New ........................ | 455/1 |
| 5,187,803 A | * | 2/1993 | Sohner et al. ............. | 455/4.1 |
| 5,224,150 A | * | 6/1993 | Neustein ................... | 340/7.25 |
| 5,295,180 A | * | 3/1994 | Vendetti et al. .......... | 455/456.2 |
| 5,373,548 A | * | 12/1994 | McCarthy .................. | 455/462 |
| 5,442,805 A | * | 8/1995 | Sagers et al. ............. | 455/456 |
| 5,450,613 A | * | 9/1995 | Takahara et al. .......... | 455/517 |
| 5,533,099 A | * | 7/1996 | Byrne ...................... | 455/552 |
| 5,548,800 A | * | 8/1996 | Olds et al. ................ | 455/12.1 |
| 5,708,975 A | * | 1/1998 | Heiskari et al. .......... | 455/1 |
| 5,950,110 A | * | 9/1999 | Hendrickson ............. | 455/1 |
| 6,011,973 A | * | 1/2000 | Valentine et al. ......... | 455/456.6 |
| 6,052,577 A | * | 4/2000 | Taguchi ................... | 455/26.1 |
| 6,069,885 A | * | 5/2000 | Fong et al. ............... | 370/336 |
| 6,085,096 A | * | 7/2000 | Nakamura ................ | 455/456 |
| 6,112,052 A | * | 8/2000 | Guthrie et al. ........... | 455/1 |
| 6,128,485 A | * | 10/2000 | Mori et al. .............. | 455/422.1 |
| 6,131,045 A | * | 10/2000 | Iwata ...................... | 455/565 |
| 6,151,493 A | * | 11/2000 | Sasakura et al. ........... | 455/421 |
| 6,163,695 A | * | 12/2000 | Takemura ................. | 455/456.4 |
| 6,201,973 B1 | * | 3/2001 | Kowaguchi ............... | 455/456 |
| 6,393,254 B1 | * | 5/2002 | Pousada Carballo et al. ... | 455/1 |
| 6,456,822 B1 | * | 9/2002 | Gofman et al. ........... | 455/1 |
| 6,584,319 B1 | * | 6/2003 | Girod ..................... | 455/74.1 |

FOREIGN PATENT DOCUMENTS

| | | | |
|---|---|---|---|
| EP | 0 546 849 A2 | * | 6/1993 |
| WO | 96/29687 | * | 9/1996 |
| WO | 97/26633 | * | 7/1997 |

OTHER PUBLICATIONS

Klandrud et al., "Beacon Control of Radio Transmitters to Reduce Radio Frequency Interference", Aug., 1992, Motorola Technical Dev., vol. 16, pp. 130–132.*

* cited by examiner

Primary Examiner—Charles Appiah
(74) Attorney, Agent, or Firm—Herbert Dubno

(57) ABSTRACT

The apparatus makes it possible to neutralize radio telephones, in spaces to be protected, by jamming the call signals or by modifying the communication signals. The variant embodiments of the apparatus are adapted so as to restrict the volume to be filtered and so as to select the filtering communications.

16 Claims, 8 Drawing Sheets

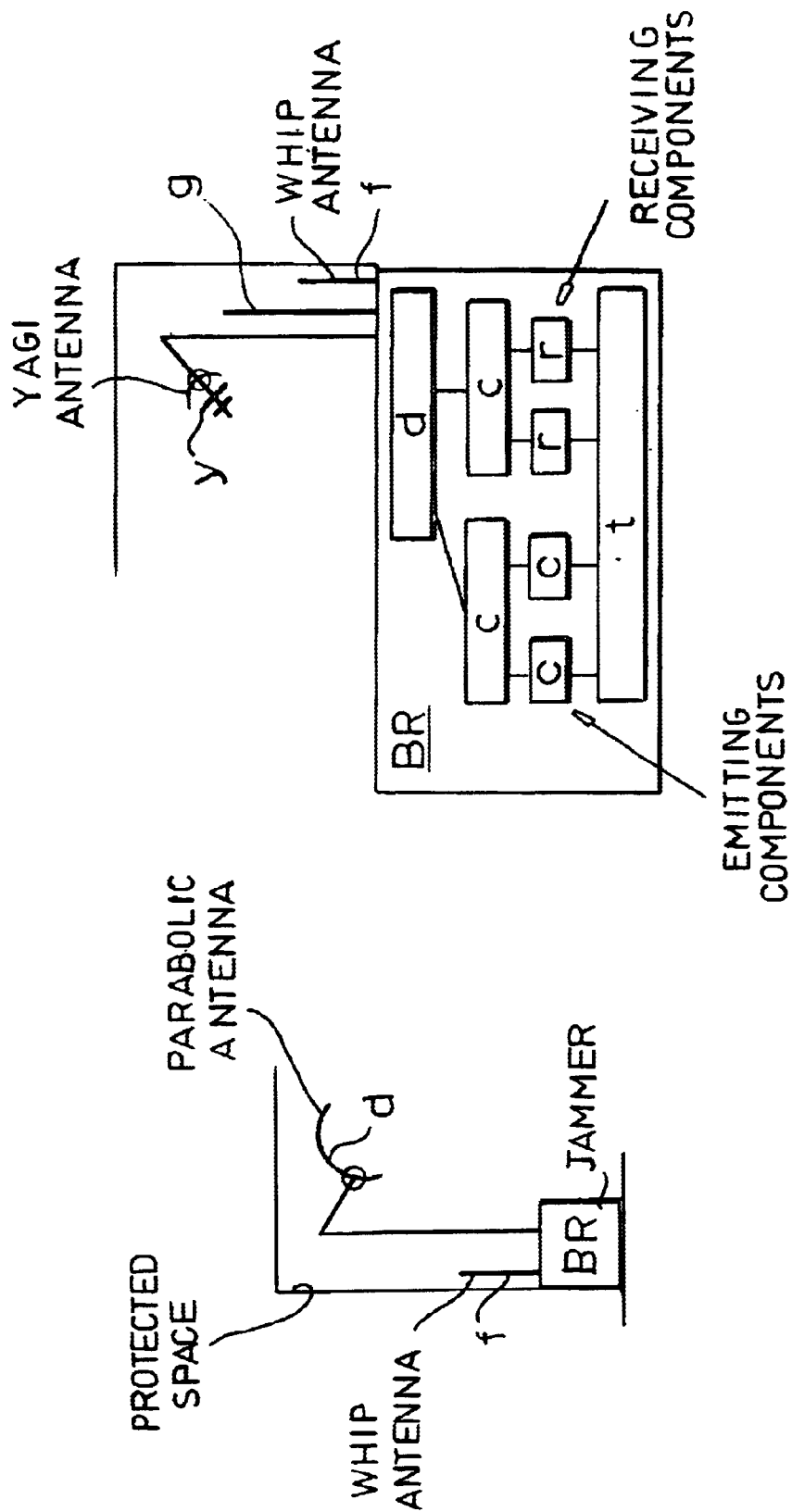

RADIOTELEPHONE FILTERING APPARATUS

CROSS REFERENCE TO RELATED APPLICATIONS

This application is a national stage of PCT/FR 98/01109 filed Jun. 2, 1998 and based upon French national applications 97.07000 of Jun. 2, 1997 and 97.10105 of Aug. 1, 1997 under the International Convention.

FIELD OF THE INVENTION

The present invention relates to an apparatus for neutralizing radio telephones in spaces where their use is prohibited or annoying.

BACKGROUND OF THE INVENTION

At present, the number of radio telephones is becoming very large. Their automatic ringing or calls are of such a nature as to annoy the other people present in the same space or to disturb the operation of acoustic or electronic apparatuses.

By way of examples, the premises to be protected may be: aircraft, auditoria, cinemas, theaters, courtrooms, schools, hospitals, meeting rooms, conference rooms, restaurants, churches, etc.

Other spaces may be relevant, whether they be open (cemeteries, etc.) or enclosed (vehicles, trains, etc.). Protection must be affected selectively as a function of the choice of those responsible for these spaces and in compliance with the global radio telephony system.

The MOTOROLA document by Weiss and Muri, Vol. 13 of July 1991 uses a system with radio relays using different frequencies from those of the base transmitters. The Patent US WEST EP 0568824 requires special mobile telephones pre-programmed to identify the zones. Our invention does not use a system with different frequencies and is applicable to mobiles currently in service. The present invention also relates to other radio messaging apparatuses which possess a ringing tone, designated hereinbelow by the general name of radio telephones.

The present invention does not relate to mobile transmitters which could be used on an ad hoc basis for police or military purposes.

OBJECT OF THE INVENTION

The object of the present invention is to deliberately neutralize radio telephones without the intervention of their users, by jamming or modifying the communications: reception and/or transmission.

SUMMARY OF THE INVENTION

We shall call the apparatus which is the subject of the invention a jammer even when it merely filters.

The present invention is based on a jamming apparatus having several options and levels of jamming and filtering. The principles of the invention are applicable to all analogue or digital radio telephony systems regardless of the systems or the standards: GSM, DCS, DECT, CT2, 3RP, PHP, PHS, PDC, AMPS, IS54, CDMA, UDPC, CDMA, DSSR, PCN, PCS, FPLMTS, UMTS, etc. with terrestrial or satellite transmitters.

According to a first variant, the present invention jams the reception of the call signals and of beacon paths.

The ringing of a radio telephone is triggered by the receiving of the individual code of the radio telephone via the airwaves.

The present variant uses the superposition onto these codes of an unidentifiable radio signal, on the same frequencies, thereby modifying the call codes which are no longer recognized by the destination radio telephones. The radio telephone will be regarded as inaccessible to the transmitter, and this will trigger a possible messaging. According to several variants, the jammer behaves as a transmitter with superposition on the radio signals so as to render them barely recognizable, either continuously, or intermittently, or as a filter by setting up a coded dialogue with the base stations.

This jammer must not disturb the communications in spaces which are not deliberately protected. The aim of the present invention is to restrict the volume to be jammed by adapting the power of the jamming signal as a function of the volume and of the nature of the materials of the walls of the premises to be protected, its angular coverage as well as the nature of the signals transmitted.

To restrict the jamming and its power, the present invention, according to one of its characteristics, will comprise a receiver which will make it possible to measure the power of the receptions and thus, to adapt the jamming in terms of power and nature. One variant makes it possible also to detect the response of local telephones so as to jam their signal at certain specific moments (intermittent).

In certain cases, the power may be less than 5 mW. According to another method, the jammer will detect and/or neutralize the radio telephones when passing into specific geographical sites: doors, etc. It will therefore be possible for the jammers to be active or passive depending on whether they include a receiver and a transmitter or only a transmitter for each system to be jammed.

Depending on their configurations, that will enable varied functionalities to be added to them:

switchover from ringing tone to buzzer, storing of calls, selective filtering of telephones according to chosen numbers, chosen sites, etc.

genuine local radio telephone switching office, able to constitute a genuine selective base station adapted to a restricted volume and for carrying out selective filtering as a function of numbers, of call type, etc. with certain analogies with current telephone switching offices.

To adapt the protection to large volumes or to volumes of any shapes, the combining of several apparatuses will be envisaged, likewise for the various standards. The radio telephone becomes operational again once it leaves the protected space, without intervention by the owner.

Messages will be displayed so as to forewarn the user of calls during his presence in jammed zones (option). In practice, a display will be able to forewarn of the protection of the premises on entry thereto and on exit therefrom.

Specifically, when the mobile telephone is used for important or urgent communications, the users must be forewarned and act under their responsibility. Several levels of jamming are envisaged: blocking of reception and/or blocking of transmission, depending on the choice of those responsible for the volumes to be protected.

The hardware which is the subject of the present invention thus consists, at least, of a housing containing a high-frequency transmitter (480,900,1800 Mhz . . . ranges depending on the standards used in the relevant country) with adjustment in terms of power and angular direction.

The transmission of the jamming signal is performed by scanning the frequency ranges used by the radio telephones. According to a first characteristic, the hardware which is the subject of the invention sends a unique periodic signal with frequencies corresponding to the receptions of the radio telephones. For the GSM900 system, for example, the jamming signal will consist of signals transmitted on the frequencies of the beacon paths for the site.

For all the other radio telephony systems present in the same premises, various frequencies will be used. It can also be transmitted on the search channel PCH more selectively, after detecting its frequencies. The call code is modified by this electromagnetic noise, the triggering of ringing does not occur.

BRIEF DESCRIPTION OF THE DRAWING

FIG. 9 is a diagram showing an apparatus according to the invention with a parabolic antenna;

FIG. 10 is a diagram using a Yagi antenna;

SPECIFIC DESCRIPTION

Figure 1:
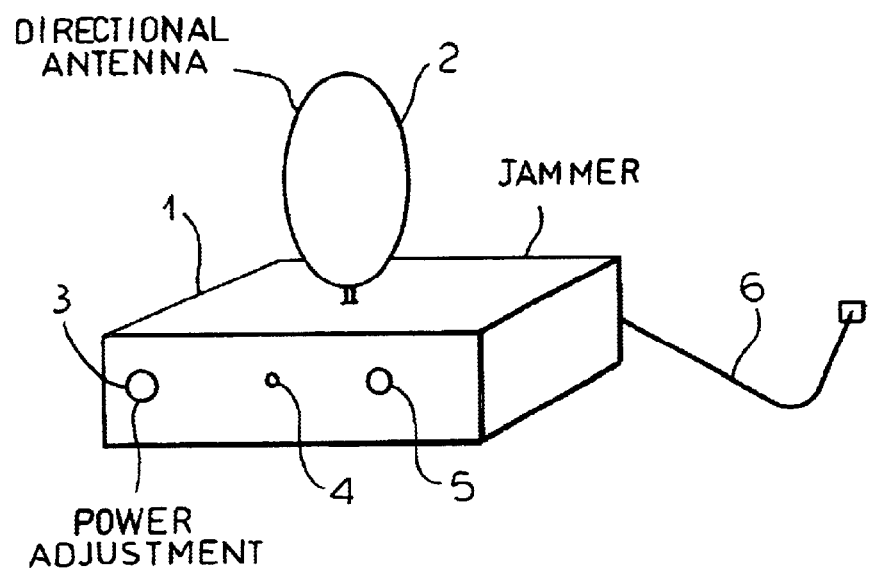
FIG. 1 is a perspective view of an apparatus according to the invention.
Figure 2:
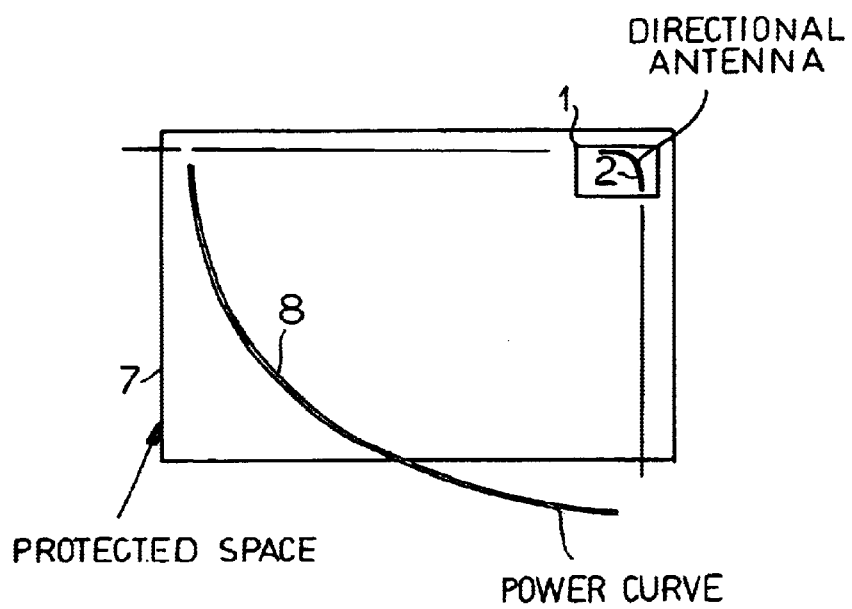
FIG. 2 is a diagram of a protected space.

FIGS. 1 and 2 show a simple jamming housing with a directional antenna making it possible to transmit and/or receive at an angle determined in terms of volume. The angle of coverage is adjusted physically by orientation with respect to the volume to be protected. The power is adjusted by a potentiometer or automatically as a function of the level received.

The power is adjusted as a function of the volume and of the nature of the walls.

Figure 3:
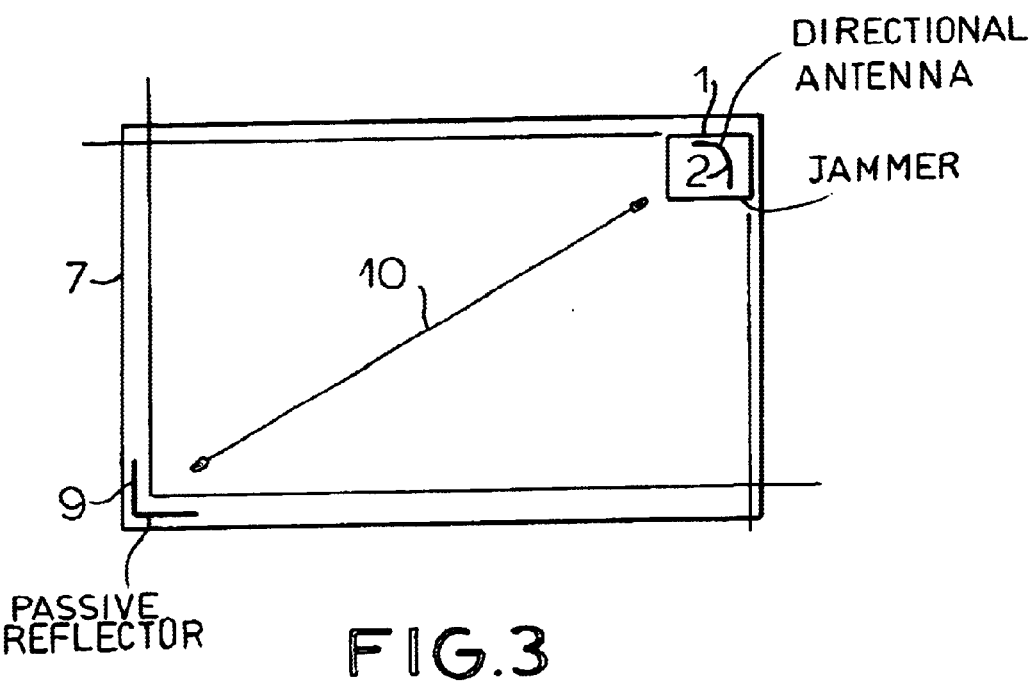
FIG. 3 is another diagram of a protected space.

FIG. 3 shows the coverage and regulation obtained by a jammer housing which contains in addition a receiver which, among other things, receives the echo of its own jamming signals.

Figure 4:
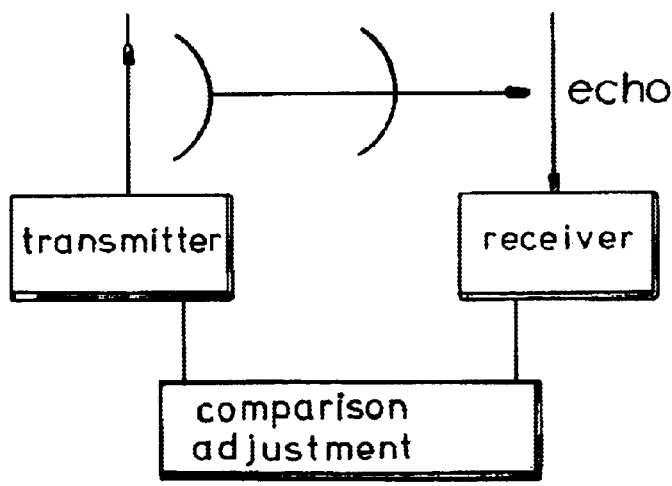
FIG. 4 is a block diagram of the system of the invention.

FIG. 4 shows the principle of electronic comparison of transmission by comparison with the echo obtained via a passive reflector, situated on the opposite side of the volume.

The power of the echo will be compared with that of the communications received so as to allow the jammer to adjust its power.

The angle and the power can therefore be adjusted and held continuously by continuous comparison between the signals transmitted and received.

This improvement can be envisaged in order to obtain just the necessary coverage without jamming the exterior of the volume to be protected.

Figure 5:
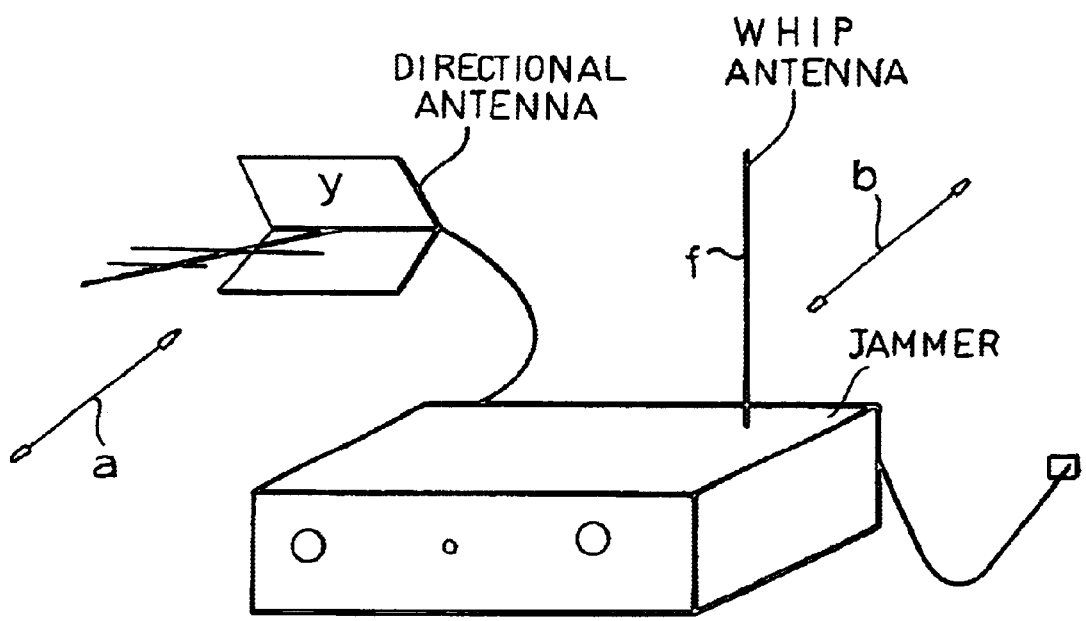
FIG. 5 is a perspective view of another apparatus for nullifying radiotelephony within a protected space.

FIG. 5 shows the configuration of a jammer with a directional antenna making it possible to detect the mobiles to be neutralized and a nondirectional antenna for receiving or transmitting with the base stations. The detecting of the mobiles which will become active makes it possible to restrict the transmissions over time. The jammer can intervene at the start of the communication procedure during the phase in which the data exchanges are not yet enciphered (encrypted). Its intervention on the signalling channels is aided by the absence of frequency hops.

Figure 6:
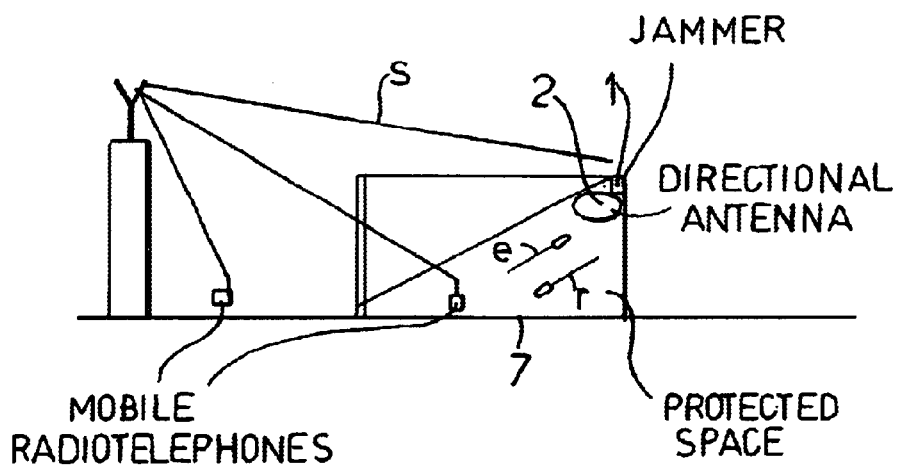
FIG. 6 is a diagram, showing the relationship of the protected space to an antenna.

FIG. 6 shows the coverage in terms of detection (e) and in terms of response (r) such as to localize to the greatest possible extent over time and in space the transmission of signals, by the apparatus which is the subject of the invention.

Figure 7:
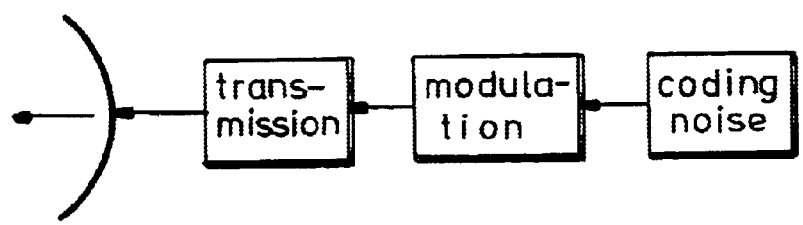
FIG. 7 is another block diagram.

FIG. 7 is a diagram of the functions of the apparatus in the simplest case of continuous jamming.

According to another characteristic, the hardware which is the subject of the invention, while using the same means for limiting the volume to be protected as previously, possesses a directional receiving and transmitting antenna which picks up, continuously and in a manner which is localized in terms of angle, the signals transmitted by the radio telephones present within this angle and transmits in a localized manner within the same angle a neutralization code. An improvement to this hardware consists in storing the types of codes to which it must respond selectively (in transmit and in receive mode) by comparing with data loaded into its memory or transmitted by the stations.

One variant consists in localizing the operation at a specified geographical passageway (door, entrance, etc.).

More complete integration is possible with the global network and operators by setting up a direct communication between the jammer and the base station or stations by radio signalling of the neutralization operations.

Figure 8:
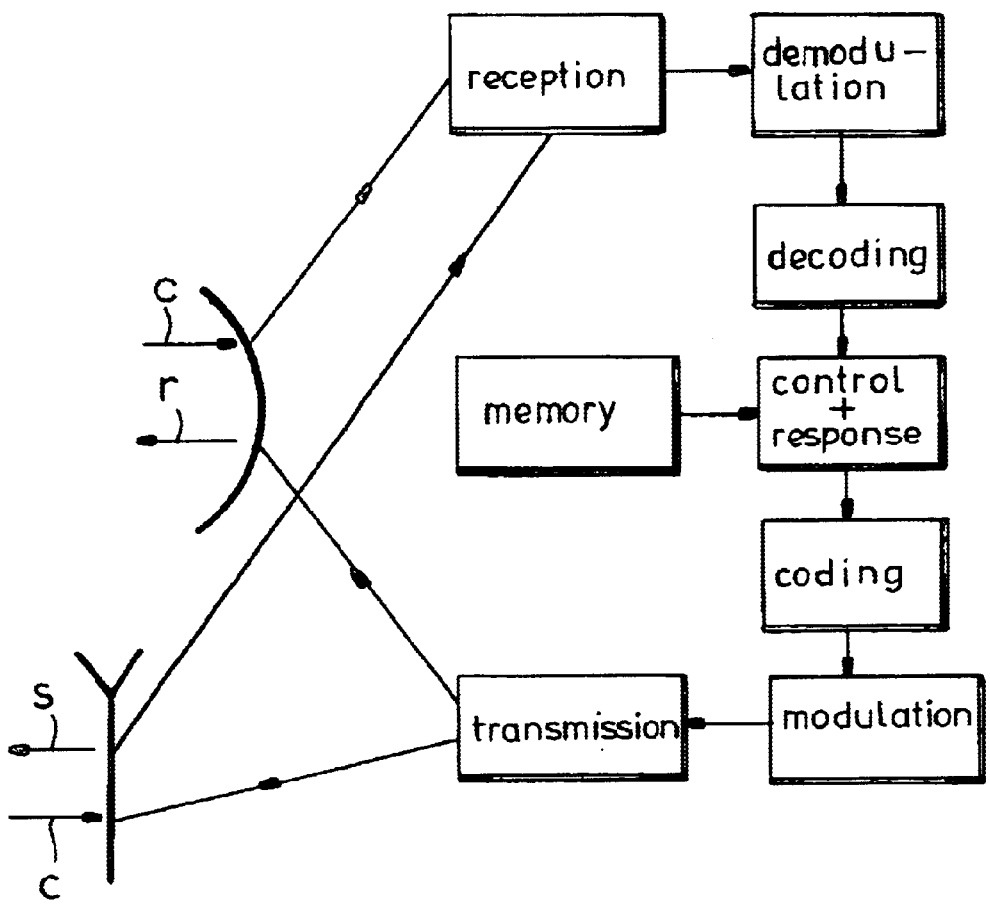
FIG. 8 is yet another block diagram.
Figure 11:
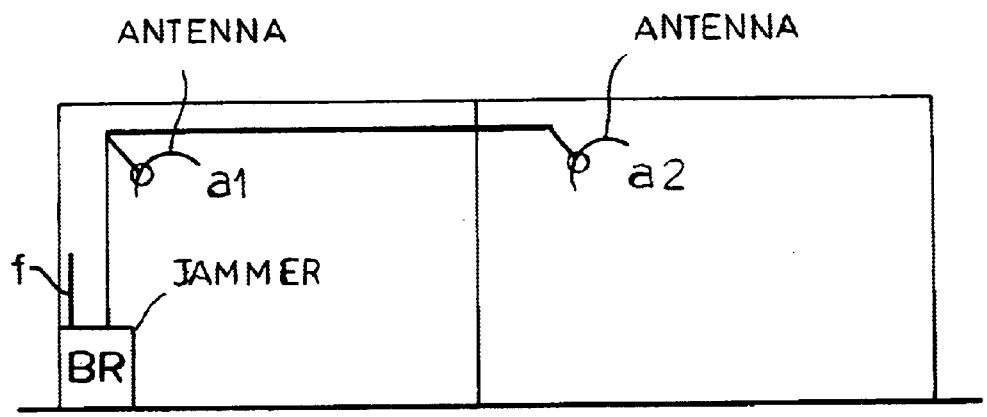
FIG. 11 is a diagram of an apparatus using multiple antennae.
Figure 12:
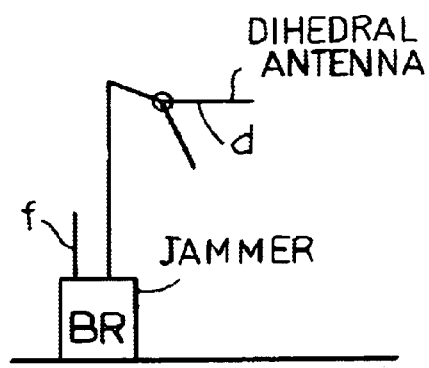
FIG. 12 is a diagram of an apparatus using dihedral antenna.
Figure 13:
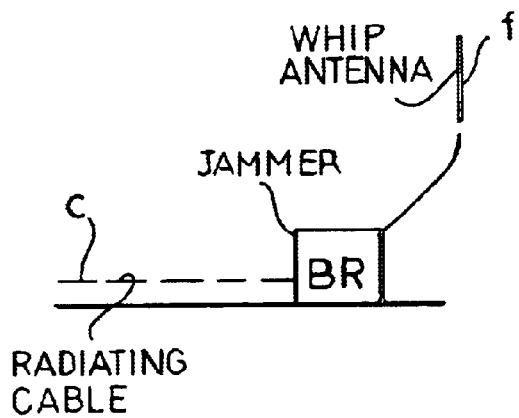
FIG. 13 is a diagram of an apparatus using radiating-cable antenna.
Figure 14:
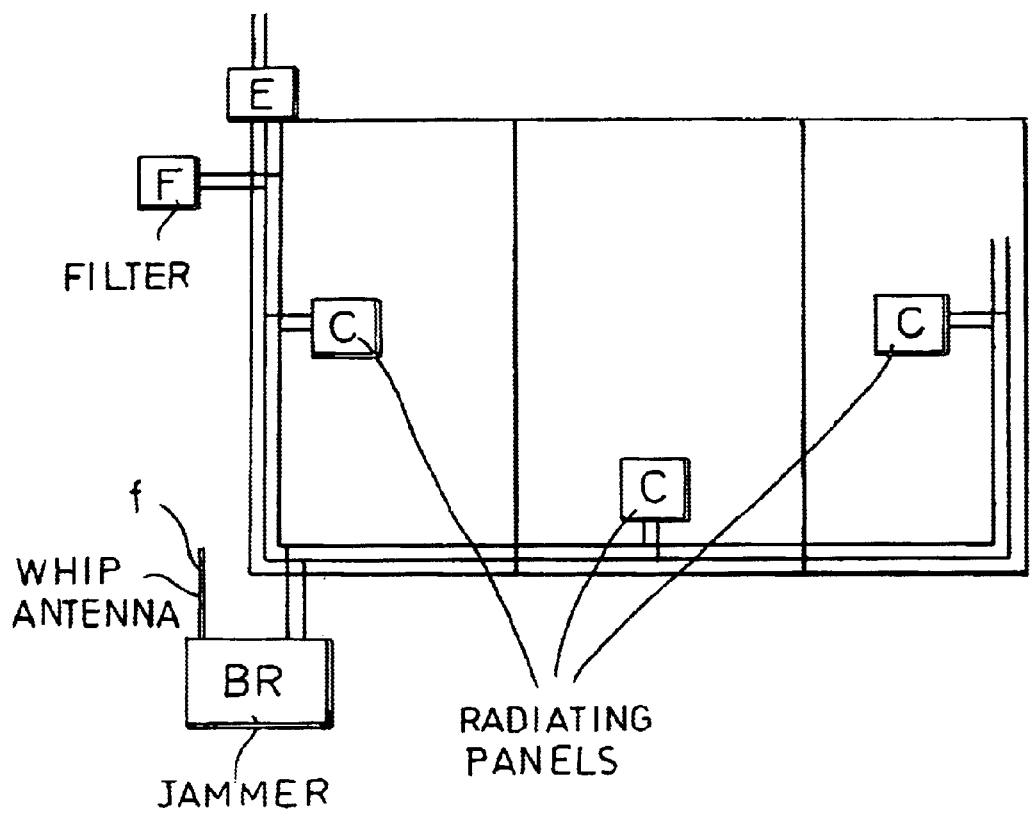
FIG. 14 is a diagram of an apparatus using a multiplicity of antennae.
Figure 16:
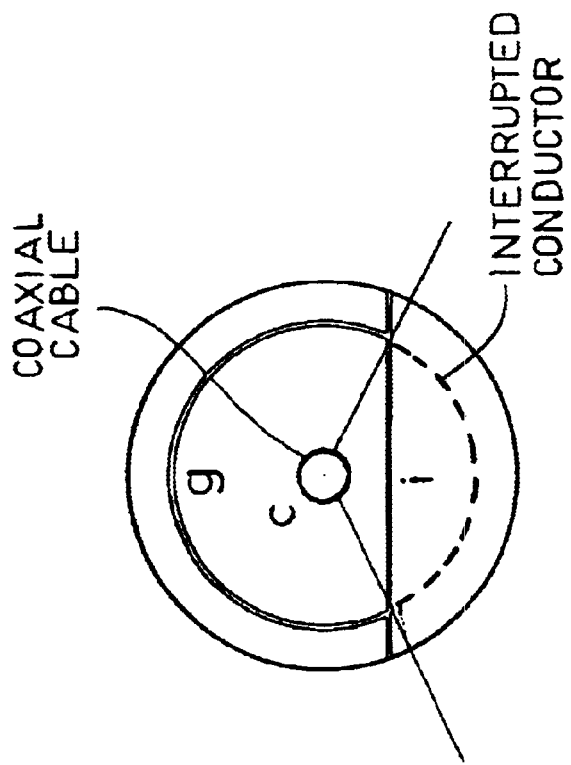
FIG. 16 is a diagram showing the use of a coaxial arrangement.
Figure 15:
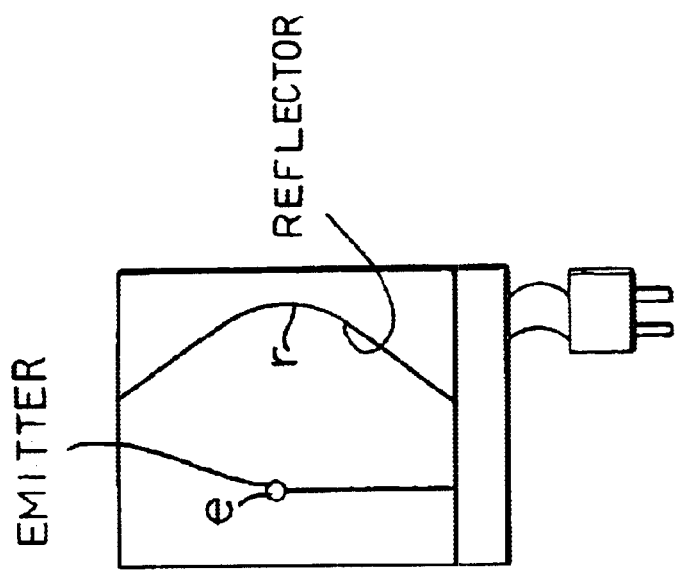
FIG. 15 is a diagram showing another use of radiators.

FIG. 8 shows the diagram of the functions fulfilled by the apparatus in this version.

In one very complete form of the apparatus, the present jammer can constitute a genuine local and selective radio telephone switching office, with a greater or lesser degree of integration with the exterior global system.

FIGS. 9 to 16 represent certain variants of the elaborate forms of the apparatus which is the subject of the invention.

The main problem is to avoid to the greatest possible extent radioelectgric pollution outside the space (open or closed) to be protected or to improve selectivity of detection. This problem is solved by the following combinations:

1. restrictions in space by:
    directivity of the jamming transmitted
    choosing an angle of transmission close to the vertical and a different phase angle
    minimum distance between the jammer and the mobile so as to use minimum power with a rapid 1/d2 decay (radiating cables or distributed sensors).
    self-regulating of the power of the jamming
2. restrictions in time by:
    transmitting signals only in the event of detecting a mobile which is transmitting in the volume, before ringing or before communicating (AB on RACH for example).

3. restrictions in the jamming information:
   minimum and "harmless" jamming signals, avoiding transmissions on the traffic and communication channels.
   selectivity related to the type of subscription or to the type of use (for example, the 112, emergency call in France, must get through).
   via synchronization dialogue with the stations and their software.

The risk of pollution becomes zero if the jammer transmits a coded signal only to the base station.

The restrictions in time are obtained by transmitting only when a mobile of the volume will recommence communicating, as an incoming or outgoing call.

Examples of configurations and operation:
1 JAMMER apparatus (BR), transmitter/receiver comprising:
1 adjustable directional antenna of the following types: parabola (d in FIG. 9), Yagi (y in FIG. 10), dihedral (d in FIG. 12), radiating cable (c, FIG. 13), panels, sectorial antennas etc. Proximity is achieved by distributing several antennas (FIG. 11, FIG. 14) and the use of:
   radiating cable (FIG. 16) constructed from coaxial cable with partial periodic interruption of the outer conductor (a few cm every 2 m for example).
   housings (FIG. 15) comprising a radiating element (e) and a concave reflecting surface (r), which are distributed (FIG. 14) within the volume to be protected and are connected to the jammer (BR).

The connection can, as a variant, use the existing electrical cables, with possibly different frequencies and installation of filter (F) for isolation from the exterior.

These directional and/or close antennas make it possible to detect the relevant mobiles and to transmit in a localized manner.

1 "whip" antenna of conventional models (if in FIGS. 9, 10, 11, 12, 13, 14).

This horizontally nondirectional antenna makes it possible to receive the station or stations, to regulate the power of the jammer, to transmit to the station and to accomplish a role of relay within the station.

Variants with more than two antennas (y,g,f) (for separating the transmission and reception functions or for adapting to the various networks, for example) are possible (FIG. 10)

This does not change the principles of the invention.
examples of operation with regard to the signals:
   detection of a mobile with incoming call by detecting an AB on RACH (signal of the presence of the mobile on the channel for access to the station).
   jamming of the mobile by transmitting one or more jamming bits on PCH (channel for calling the mobiles from the station)
   response of the jammer to the station (signal to be defined with the operators), for complete or selective filtering. (clean dialogue with the stations).
   detection of an outgoing call (transmitted by the mobile): CR on RACH (request for channel by the mobile on the channel for access to the station)
   jamming of mobiles by transmission of a "false" local BCCH and no connection (BCCH: fixed identification channel transmitted by the stations)
   etc.
   filtering by operating the jammer as a retransmitter or substation.

The choices of the solutions adopted will have to be made with the radio telephony operators in order as far as possible to eliminate undesirable interventions in respect of the global network.

ADAPTIONS of mobiles and premises:
   (see patent FR 9708546 of Jan. 7, 1997)
   for urgent or preferential links (doctors, etc.), a minimum service will be ensured even if a jamming signal is detected.
   adaptation for detection at geographical entrances/exits to premises.
   creation of booths or unjammed connections.

LINKS with stations:
   adaptations of station software so as to manage selective filterings in conjunction with the jammers, with various classes of priority subscriptions.
   the jammer is identified by the networks and becomes a component, possibly with a subscription and traffic billing.

What is claimed is:

1. An apparatus for at least partially neutralizing transmission and reception of a radiotelephone in a predetermined interior space, comprising:
   a radiotelephony jammer including at least one transmitter capable of transmitting signals of the same frequencies used for communication between radiotelephones in said space and respective base stations and including means for modifying information transmitted between said radiotelephones and said base stations so as to inhibit use of the radiotelephones in said space; and
   means for forming a radio link between said jammer and said base stations and responsive to active radiotelephones for forewarning a respective base station of jamming of communication between the active radiotelephone and the respective base station.

2. An apparatus for at least partially neutralizing transmission and reception of a radiotelephone in a predetermined interior space, comprising:
   a radiotelephony jammer including at least one transmitter capable of transmitting signals of the same frequencies used for communication between radiotelephones in said space and respective base stations and including means for modifying information transmitted between said radiotelephones and said base stations so as to inhibit use of the radiotelephones in said space; and
   means for detecting a locally active mobile radiotelephone and transmitting to a respective one of said base stations a code requesting filtering by the respective base station without transmitting to the locally active mobile radiotelephone.

3. The apparatus defined in claim 2 wherein said jammer includes means for transmitting a filtering code destined for said locally active mobile radiotelephone.

4. An apparatus, located in a predetermined space, working without location determining means incorporated or associated with each radio telephone, making it possible to partially or completely neutralize in that predetermined space transmission and reception capabilities of radio telephones, comprising at least one transmitter for transmitting signals of the same frequencies as the frequencies used for communications between said radio telephones and respective base stations with which they can communicate and for regulating power and radio coverage as a function of the volume of the space, said transmitter comprising means for modifying information contained in signals transmitted or received by said radio telephones or by the base stations.

5. The apparatus according to claim 4, further comprising a receiver for detection of the emissions of radio telephones present in the predetermined space for adapting the nature or the power of the signals.

6. The apparatus according to claim 5 which comprises, in addition, a receiver for radio links with the base stations.

7. The apparatus according to claim 5 which comprises a transmitter for radio links with the base stations.

8. The apparatus according to claim 5 which comprises one or more selective antennas for detected transmissions of the radio telephones present in the predetermined space.

9. The apparatus according to claim 8 wherein selective antennas are distributed in the predetermined space as a function of a geometry of the predetermined space.

10. The apparatus according to claim 8 wherein the selective antennas are directional in terms of angle.

11. The apparatus according to claim 8 wherein the selective antennae are of the radiating cable type.

12. The apparatus according to claim 8 wherein the transmitters and antennas are designed in multiples for frequency ranges of the respective radio telephone standards.

13. The apparatus according to claim 4 which transmits a continuous jamming signal destined for the radio telephones.

14. The apparatus according to claim 4 which comprises means for detecting transmissions of radio telephones in said space and sending said radio telephones an intermittent jamming signal before they ring or call.

15. The apparatus according to claim 14 which receive signals from the base stations and adjusts the power and the nature of the signals, with modification of information retransmitted and supplied to the radio telephones.

16. The apparatus according to claim 4 which transmits radio signals only on an identification channel.

* * * * *